Figure 3:
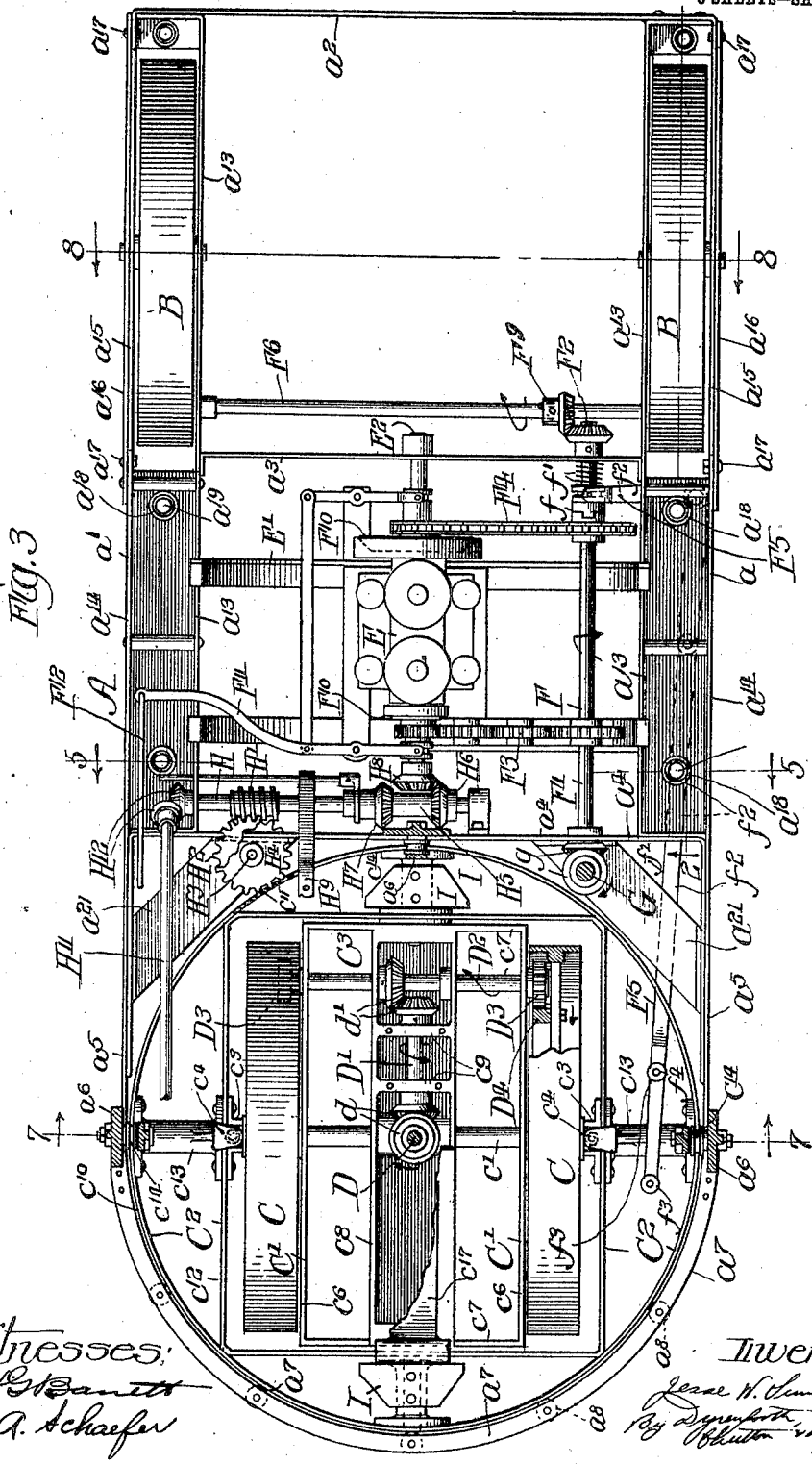

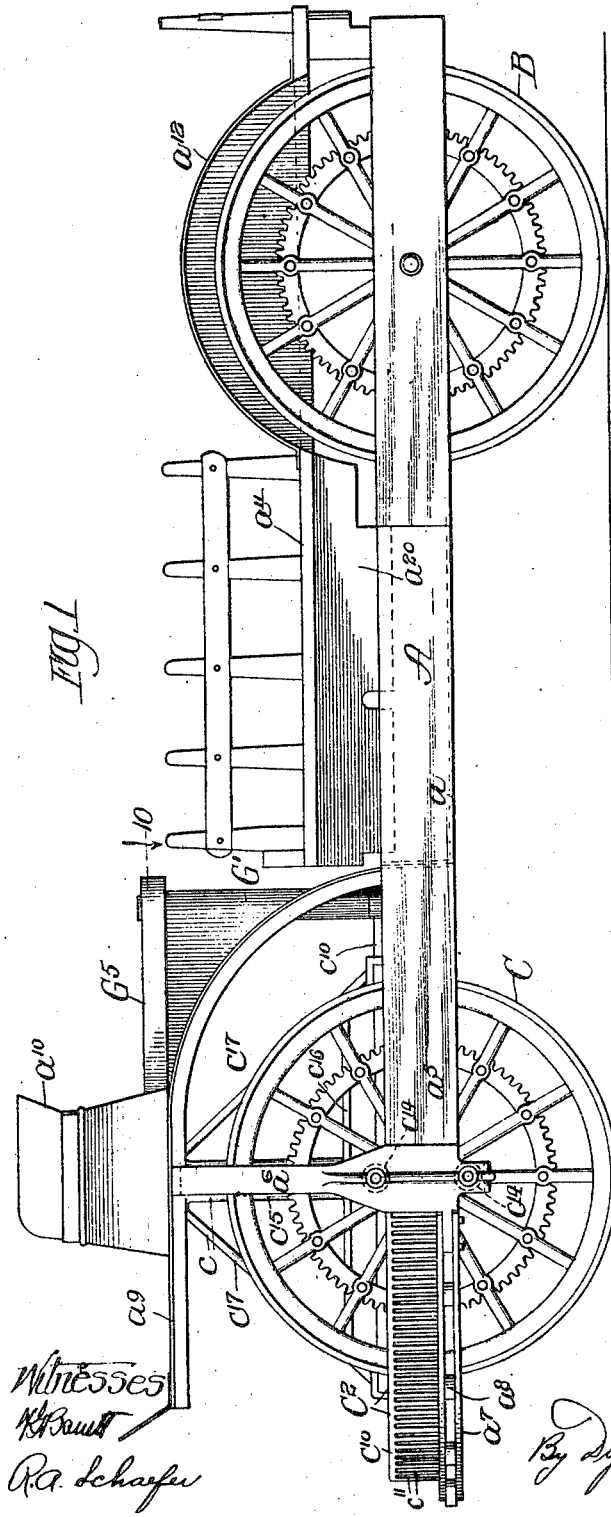
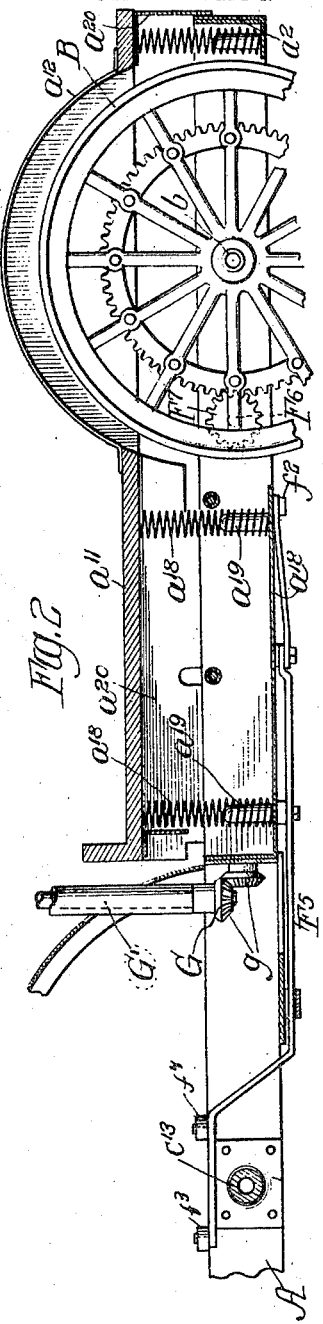

J. W. SUNDERLAND.
MOTOR VEHICLE.
APPLICATION FILED AUG. 26, 1907.

965,605.

Patented July 26, 1910.
5 SHEETS—SHEET 2.

Witnesses:
Inventor:

J. W. SUNDERLAND.
MOTOR VEHICLE.
APPLICATION FILED AUG. 26, 1907.
965,605.
Patented July 26, 1910.
5 SHEETS—SHEET 3.
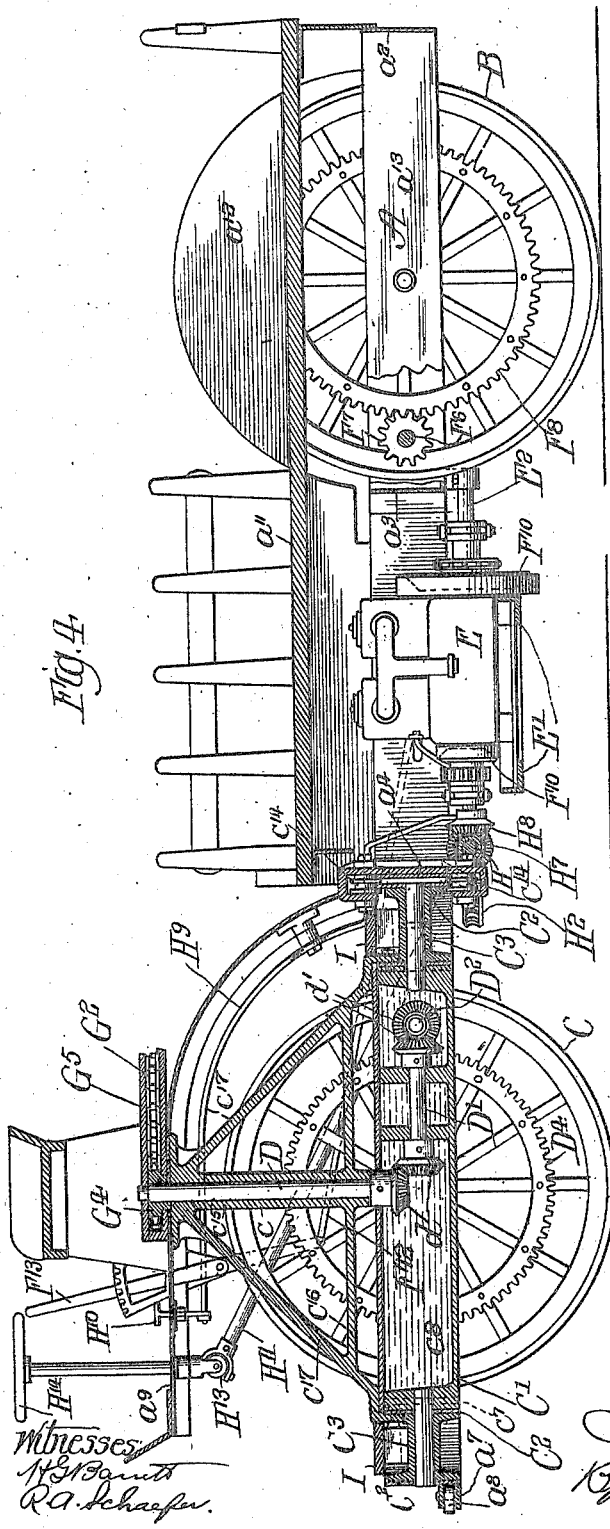
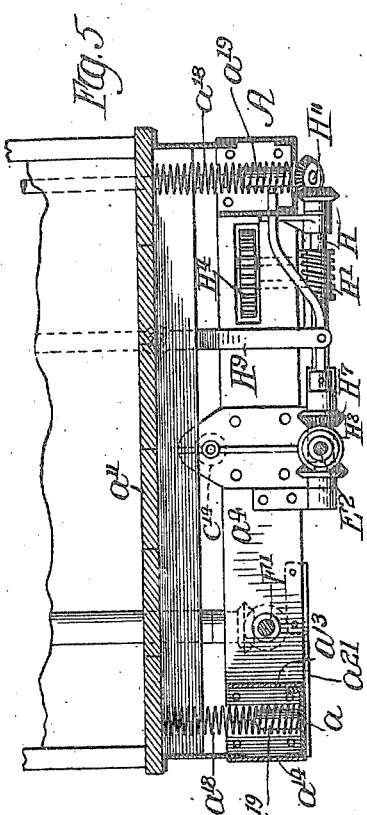
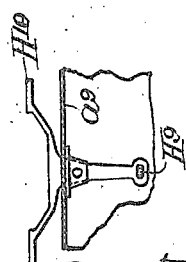

J. W. SUNDERLAND.
MOTOR VEHICLE.
APPLICATION FILED AUG. 26, 1907.

965,605.

Patented July 26, 1910.
5 SHEETS—SHEET 4.

Witnesses:
H. W. Barritt
R. A. Schaefer.

Inventor
Jesse W. Sunderland
By Dyrenforth, Lee, Chritton & Wiles
his Attys

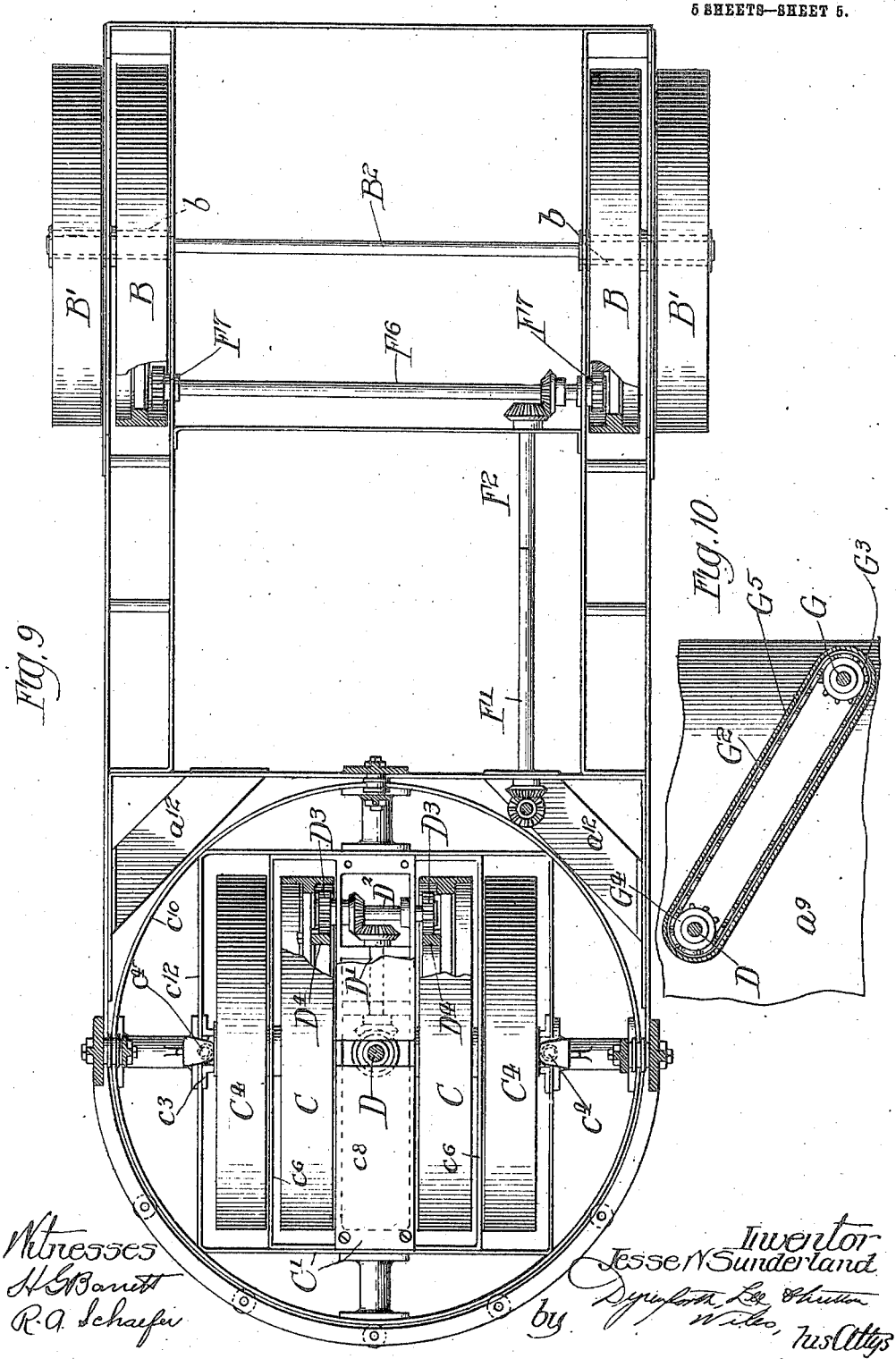

UNITED STATES PATENT OFFICE.

JESSE W. SUNDERLAND, OF OAK PARK, ILLINOIS, ASSIGNOR TO THE T. J. THORP MANUFACTURING COMPANY, OF CORVALLIS, OREGON, A CORPORATION OF OREGON.

MOTOR-VEHICLE.

965,605.   Specification of Letters Patent.   Patented July 26, 1910.

Application filed August 26, 1907. Serial No. 390,098.

*To all whom it may concern:*

Be it known that I, JESSE W. SUNDERLAND, a citizen of the United States, residing at Oak Park, in the county of Cook and State of Illinois, have invented a new and useful Improvement in Motor-Vehicles, of which the following is a specification.

My invention pertains particularly to self-propelled trucks or motor-vehicles for carrying heavy loads; and my primary object is to provide a motor-vehicle, of the character indicated, of improved general construction. In said construction, provision is made for the employment of both the front and rear wheels for traction purposes, and a feature of importance is the provision of steering and power-transmission mechanisms so related that the rear traction-wheels will be automatically maintained disconnected from the motor while the front traction-wheels are traveling in a direction substantially at right angles to the longitudinal axis of the vehicle, as where it is desired to turn the machine from a street-car track or to remove the machine from a difficult position where a straight pull would not suffice for the purpose.

The invention, in its preferred embodiment, is illustrated in the accompanying drawings.

It may be preliminarily stated that in this construction there are employed: front traction-wheels which support a wheel-frame equipped at its front and rear portions with longitudinal trunnions; a circle, or turn-table, supported on said trunnions and equipped with guides in which move guide-blocks carried by the front axle which extends through and oscillates with the front wheel-frame; a main frame having its front end anti-frictionally mounted on said circle to permit free turning of the circle about a vertical axis, for steering purposes; a vertical shaft at the axis of said circle and geared to a longitudinal shaft journaled in the front wheel-frame co-axial with the trunnions thereof, which shaft is geared to the front traction-wheels; an engine mounted on the main frame and having a longitudinally disposed crank-shaft; a transverse shaft adjacent the front end of said crank-shaft equipped with a splined shiftable sleeve having two bevel-gears fixed thereon, either one of which may be thrown into engagement with a bevel-gear on the front end of said crank-shaft; a T-shape foot lever for shifting said sleeve and the bevel-gears carried thereby; a worm on said transverse shaft meshing with a worm-wheel carried by a vertically disposed shaft which is located adjacent the periphery of said circle and equipped with a gear meshing with teeth with which said circle is equipped; a hand-wheel geared to said worm-shaft to permit of hand-steering; a divided longitudinal shaft with means for transmitting power in either direction to the front section thereof from the engine shaft, the front section thereof being geared to the first-mentioned vertical shaft and the rear section thereof being geared to the rear traction-wheels; a clutch controlling the transmission of motion from the front section to the rear section of said divided shaft; automatic controlling means for said clutch, controlled by cams carried by said circle; a pair of clutches controlling the transmission from the engine-shaft to the front section of said divided shaft; and a hand-lever for moving said last-named clutches simultaneously in either direction, whereby either one of said clutches may be operatively connected with the engine-shaft, it being understood that said clutches both occupy normally a neutral position. It will thus be understood that the rear traction-wheels act with the front traction-wheels normally for propelling purposes, except when the front wheels are steered so as to head sharply at an angle to the longitudinal axis of the vehicle, when the clutch especially controlling the rear traction-wheels automatically disconnects the rear section of said divided shaft from the front section thereof, thereby preventing power from being transmitted to the rear traction-wheels at a time when injury might result from such application of power. Of course, it will be understood that both engine-shaft clutches may occupy the neutral position while the engine is employed to turn the circle to bring the front wheels cross-wise of the longitudinal axis of the machine; or all of the traction-wheels may be kept in operation while the engine is at the same time operating to turn the circle for ordinary steering purposes, where the character of the road is such as to make it desirable to employ power-steering means for ordinary steering purposes, as frequently may happen where the road is either soft or rough.

Figure 7:
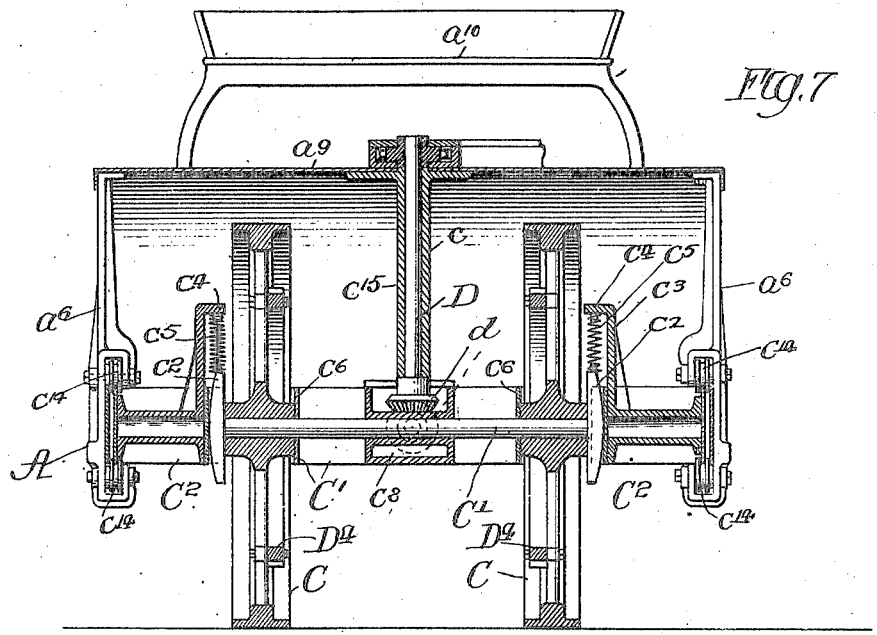
Figure 8:
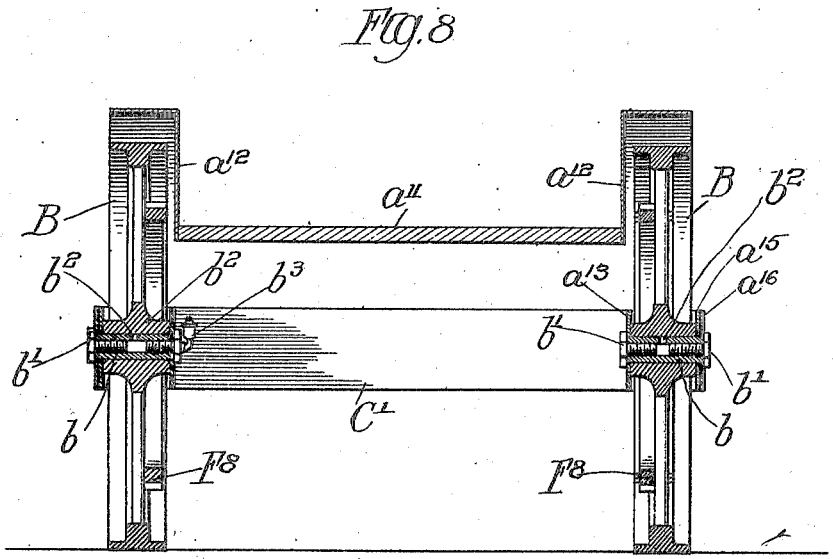

In the drawings—Figure 1 represents a side-elevational view of a motor-vehicle constructed in accordance with my invention; Fig. 2, a broken longitudinal sectional view taken as indicated at line 2 of Fig. 3; Fig. 3, a view of the machine partly in plan and partly in section, with the load-platform of the machine removed; Fig. 4, a longitudinal sectional view; Fig. 5, a transverse section taken at line 5 of Fig. 3; Fig. 6, a detail view of a foot-lever employed in connection with the power-operated steering mechanism; Fig. 7, a sectional view taken as indicated at line 7 of Fig. 3; Fig. 8, a sectional view taken as indicated at line 8 of Fig. 3; Fig. 9, a view similar to Fig. 3, showing a modified construction in which additional supporting wheels for the vehicle are employed, and Fig. 10, a broken sectional view taken as indicated at line 10 of Fig. 1.

In the construction illustrated, A represents the main frame of the machine; B, a pair of rear traction-wheels supporting the rear portion of the main frame; C, a pair of front traction-wheels which support a front traction-wheel frame $C^1$; $C^2$, a circle, or turn-table supported at its front and rear portions upon trunnions $C^3$ with which the wheel-frame $C^1$ is equipped at its front and rear portions, the front portion of the main frame being anti-frictionally mounted upon the circle $C^2$ to permit steering of the machine; D, a vertical shaft co-axial with the axis of the circle $C^2$ and journaled in a standard $c$ with which the circle $C^2$ is equipped; $D^1$, a horizontal shaft journaled in the front wheel-frame $C^1$ and co-axial with the trunnions of said wheel-frame, the shaft $D^1$ being actuated by the shaft D through the medium of bevel-gears $d$; $D^2$, a transverse shaft journaled in the front wheel-frame $C^1$ and connected, by bevel-gears $d^1$, with the shaft $D^1$; $D^3$, pinions carried by the shaft $D^2$ and meshing with the gear-wheels $D^4$ with which the front traction-wheels C are equipped; E, a motor mounted on a sub-frame, or cradle, $E^1$ carried by the main frame and centrally located with relation to the vehicle, said motor having a longitudinally-disposed crank-shaft $E^2$; F, a longitudinally-disposed divided shaft journaled in the main frame and comprising a front section $F^1$ and a rear section $F^2$; $F^3$, means for communicating motion from the engine-shaft to the front shaft-section $F^1$ in a direction to propel the vehicle forwardly; $F^4$, means for communicating motion from the engine-shaft to the front shaft-section $F^1$ in a direction to propel the vehicle rearwardly; $F^5$, automatically-controlled clutch-mechanism for coupling the rear shaft-section $F^2$ to the front shaft-section $F^1$, whereby the rear traction-wheels may be automatically disconnected from the motor when the front traction-wheels are turned sharply at an angle to the longitudinal axis of the machine; $F^6$, a transverse shaft journaled in the main frame and equipped with pinions $F^7$ meshing with gears $F^8$ with which the rear traction-wheels B are equipped; $F^9$, bevel-gears connecting the rear shaft-section $F^2$ with the shaft $F^6$; $F^{10}$, engine-shaft clutches controlling the power-transmission means $F^3$, $F^4$, said clutches occupying normally a neutral position and being capable of being shifted simultaneously in either direction by lever-mechanism $F^{11}$ connected by a link $F^{12}$ with a hand-lever $F^{13}$; G, a vertically-disposed shaft journaled in a bearing $G^1$ and connected at its lower end by bevel-gears $g$ with the front end of the front shaft-section $F^1$; $G^2$, (Figs. 4 and 10) a chain serving to transmit motion from a wheel $G^3$ on the upper end of the shaft G to a wheel $G^4$ on the upper end of the shaft D, said chain being contained in a housing $G^5$; H, a transversely-disposed worm-shaft located adjacent to the front end of the engine-shaft and equipped with a worm $H^1$ meshing with a worm-wheel $H^2$ on a vertically-disposed shaft $H^3$ which is equipped at its upper end with a toothed wheel $H^4$ meshing with teeth with which the circle, or turn-table, $C^2$ is provided; $H^5$, a shiftable sleeve on the shaft H equipped with bevel-gears $H^6$, $H^7$, between which is located a bevel-gear $H^8$ with which the front end of the engine-shaft is equipped; $H^9$, a lever serving to shift the sleeve $H^5$, said lever $H^9$ being operated by a T-shaped foot-lever $H^{10}$; $H^{11}$, an inclined shaft connected by the bevel-gears $H^{12}$ with the worm-shaft H and by universal connection $H^{13}$ with a vertical shaft carrying a hand-wheel $H^{14}$, and I, cams carried by the circle, or turn-table, and adapted to automatically disconnect the rear shaft-section $F^2$ from the front shaft-section $F^1$, thereby to deprive the rear traction-wheels of power when the front wheels are turned sharply from a direct course.

The frame A preferably comprises side-members $a$, $a^1$ of channel form, the bottom of each channel being cut away at the rear portion thereof to accommodate the rear traction-wheels; cross-members $a^2$, $a^3$, $a^4$ connecting said side-members; forward extensions $a^5$ extending forwardly from the channel-form members $a$, $a^1$; standards $a^6$ carried by such extensions and by the cross-member $a^4$; a channel-form curved member $a^7$ connected with the base portions of said standards and having its bottom cut away throughout a portion of its length, and rollers $a^8$ mounted therein and adapted to bear against the periphery of the circle $C^2$; a seat-platform $a^9$ comprising a member having its rear portion curved downwardly and connected with the cross-member $a^4$ of the frame and having its lateral portions supported on the standards $a^6$; a seat $a^{10}$ mounted on said platform; and a removable load-platform $a^{11}$ supported on the rear portion of the main frame and provided with housings $a^{12}$ for the rear traction-wheels; each of the channel-form frame-members $a$, $a^1$, may be built up of structural flat steel, including an inner member $a^{13}$ and an outer member $a^{14}$, spaced to receive the rear traction-wheels between them. Each outer member $a^{14}$ has a removable section $a^{15}$ carried by a bar $a^{16}$ which is removably secured by bolts $a^{17}$ to the adjacent frame-members. The wheels B are journaled on tubular spindles $b$ whose ends extend through the bars $a^{13}$, $a^{15}$, $a^{16}$, being confined in place by removable headed screws $b^1$. The tubular spindles are provided with oil-ducts $b^2$ and at each wheel an oil-cup $b^3$ is connected with one of the screws $b^1$ to admit oil to the interior of the spindles. It will be understood that the rear wheels may be removed by removing the bars $a^{16}$ and the bar-sections $a^{15}$ connected therewith. The bottoms of the channel-form members $a$, $a^1$, support springs $a^{18}$ whose lower ends encircle studs $a^{19}$ rising from the bottoms of said channel-form members. The platform $a^{11}$ is supported on said springs and has depending flanges $a^{20}$ telescoping with the outer frame-members $a^{14}$ and the rear frame-members $a^2$, whereby shifting of the platform is avoided. As shown in Fig. 3, the forward extensions $a^5$ of the main frame are connected with the front cross-member $a^4$ by brace-bars $a^{21}$.

As appears from Figs. 3, 4 and 7, the front traction-wheels are journaled on a comparatively short axle $c^1$ which supports the front wheel-frame $C^1$ and whose ends are equipped with bearing-blocks $c^2$ movable in vertically-disposed guides $c^3$ with which the circle, or turn-table, $C^2$ is equipped. Between the upper ends of the bearing-blocks $c^2$ and stops $c^4$ provided at the upper ends of the guides $c^3$ are confined springs $c^5$ which yieldingly resist the tilting of the wheel-frame $C^1$ on its trunnions. The wheel-frame $C^1$ is of the rectangular form shown. It comprises longitudinal side-members $c^6$, front and rear cross-members $c^7$ which carry the trunnions $C^3$, and a channel-form intermediate longitudinal member $c^8$ in which are provided the bearings $c^9$ for the shaft $D^1$. The ends of the axle $c^1$ project past the outer side-members $c^6$ of the frame $C^1$ and the wheels C are journaled thereon between the frame-members $c^6$ and the bearing-blocks $c^2$. The bevel gears $d$ permit oscillation of the wheel-frame $C^1$ on its trunnions, as will be understood.

The turn-table $C^2$ comprises a circular steel band $c^{10}$ having teeth $c^{11}$ cut therein and meshing with the teeth of the wheel $H^4$, and an inscribed rectangular frame $c^{12}$ secured at its corners to the circular band $c^{10}$. The central portions of the side-members of the frame $c^{12}$ are firmly connected with the band by cross-members $c^{13}$. The rectangular frame $c^{12}$ is of sufficient size to accommodate within it the wheel-frame $C^1$ and the wheels C flanking the same. The guides $c^3$ are carried by the side-members of the rectangular frame $c^{12}$. The front portion of the main frame A is equipped with rollers $c^{14}$ which engage the upper and lower edges of the steel band $c^{10}$, thereby supporting the front end of the main frame, and, as noted, the rollers $a^8$ on the front end of the main frame bear against the outer periphery of the steel band $c^{10}$. It will now be understood that the front wheel-frame may tilt with relation to the circle $C^2$, and hence with relation to the main frame, and that the circle $C^2$ may turn freely in the front end of the main frame about a vertical axis for steering purposes; and it will be further understood that power may be transmitted freely to the front wheels, regardless of the tilting of the front wheel-frame and regardless of the angular position of the front wheel-frame in the steering operation. It may be added that the standard $c$ in which the shaft D is journaled comprises a central tubular member $c^{15}$, a horizontal longitudinal member $c^{16}$ joined centrally to the lower portion of said tubular member, and inclined members $c^{17}$ connecting the upper end of the tubular member $c^{15}$ with the extremities of the longitudinal member $c^{16}$ and with the front and rear cross-members of the rectangular frame $c^{12}$. It will thus be seen that there is provided a triangularly-braced structure affording a bearing for the shaft D which is amply strong for its purpose. The arrangement of the shaft D and the means for communicating power therefrom to the front traction-wheels will be understood without further description.

The motor E may be of any approved kind. It is shown as an upright engine whose longitudinally-disposed shaft extends to the front and rear of the engine-cylinders, the clutches $F^{10}$ being located near opposite ends of the shaft and operated in the usual manner to connect the gearing $F^3$ or the gearing $F^4$ to the shaft, at will. It is understood that the clutch-members of the engine-shaft may turn idly thereon when not thrown to the operative position.

The shaft F extends parallel with the engine-shaft and is located at one side of the engine-shaft. The clutch-mechanism $F^5$ comprises a clutch-member $f$ adapted to connect the rear shaft-section $F^2$ to the front shaft-section $F^1$, a spring $f^1$ normally maintaining said clutch in the operative position, and a bell-crank clutch-shifting lever $f^2$ having its long arm extending forwardly to a position adjacent to one of the side-members of the rectangular frame $c^{12}$ of the circle $C^2$ and equipped in the front and rear of the adjacent member $c^{13}$ respectively with rollers $f^3$, $f^4$, adapted to be engaged by the cams I when the circle is turned from a direct course to a course nearly at right angles to the longitudinal axis of the machine. It will be understood, of course, that the arrangement may be varied to cause the automatic disconnection of the rear traction-wheels from the motor to be effected at any desired angular relation of the turn-table and to be maintained disconnected until the turn-table is returned to a position approaching the direct course for the front wheels. Also the lever $f^2$ may be actuated by hand, if desired.

The transmission of power from the shaft G to the shaft D may be accomplished by any suitable transmission-means. Chain-transmission means of improved construction is now available on the market for such purpose and answers the purpose admirably.

As indicated, the shaft H may be operated either by power to steer the machine, by shifting the sleeve $H^5$ to bring either the bevel-gear $H^6$ or the bevel-gear $H^7$ into engagement with the bevel-gear $H^8$, according to the direction in which it is desired to turn the turn-table; or the machine may be steered by hand by operating the shaft H through the medium of the shaft $H^{11}$ and the hand-wheel $H^{14}$.

The cams I may be suitably mounted on the circle $C^2$ in any desired manner. As shown, they are located at the front and rear portions of the circle adjacent to the bearings for the trunnions of the front wheel-frame. They may be designed to effect disconnection of the rear traction-wheels from the motor when the turn-table is turned through any desired number of degrees.

In the construction illustrated in Fig. 9, provision is made for journaling the front traction-wheels C in the frame $C^1$ between the side-members $c^6$ and the intermediate member $c^8$ of said frame, and additional supporting-wheels $C^4$ are journaled on the axle $c^1$ outside of the frame-members $c^6$, the wheels $C^4$ being without gearing. In this construction the shaft $D^2$ is shortened correspondingly. A pair of additional supporting-wheels $B^1$ is provided for the rear portion of the machine, said wheels being journaled upon a shaft $B^2$ which extends through the tubular spindles $b$ upon which the wheels B are journaled. The wheels $B^1$ are without gearing, and serve, in connection with the wheels $C^4$, to adapt the machine to travel upon soft ground. At the same time, the arrangement is such as not to interfere with the facility of steering or turning the machine.

It may be remarked that in practice differential gearing will be employed to permit relative movement between the front traction-wheels and also between the rear traction-wheels, the shafts $D^2$ and $F^6$ being divided for this purpose. For simplicity of illustration, these shafts are shown as continuous shafts.

The operation will be readily understood from the foregoing detailed description. The engine-shaft may operate continuously without operating either the front or rear traction-wheels or the steering-mechanism. When it is desired to propel the machine forwardly the clutch-members $F^{10}$ are thrust rearwardly through the medium of the lever $F^{13}$, thereby throwing the front clutch-member $F^{10}$ into operative engagement with the engine-shaft and communicating motion to the front shaft-section $F^1$, whence it is transmitted through the shaft G, chain $G^2$ and shaft D to the front traction-wheels, and through the clutch $f$ to the rear shaft-section $F^2$ and thence to the rear traction-wheels, the clutch $F^2$ being normally operatively connected with the front shaft-section $F^1$ and rear shaft-section $F^2$. While the traction-wheels are thus operating, the machine may be steered either by hand or by power. It may be steered by hand by operating the worm-shaft H through the medium of the shaft $H^{11}$ and hand-wheel $H^{14}$; or it may be operated by power by shifting the sleeve $H^5$ through the medium of the foot-lever $H^{10}$. The motion of the machine may be reversed by shifting the clutch-members $F^{10}$ forwardly, thereby bringing the rearmost one of said clutch-members into operative engagement with the engine-shaft. If desired, clutch-members $F^{10}$ may be left in a neutral position while the power of the engine is employed to turn the steering-mechanism.

The foregoing detailed description has been given for clearness of understanding only, and no undue limitation is to be understood therefrom.

What I regard as new, and desire to secure by Letters Patent, is—

1. In a self-propelled vehicle the combination with a pair of front traction-wheels, a pair of rear traction-wheels, and steering mechanism, of a shaft geared to said front traction-wheels, a shaft geared to both rear traction-wheels, a motor, means for communicating motion from said motor to said shafts, a clutch interposed between said motor and said second-named shaft, and automatic clutch-releasing means operative to effect release of said clutch and thereby disconnect both rear traction-wheels after said front traction-wheels have been turned from a direct course through a predetermined angle.

2. In a self-propelled vehicle, the combination with the front and rear traction-wheels thereof and steering-mechanism, of a shaft geared to a front traction-wheel, a motor, means for communicating motion from the motor to said shaft in either direction, a shaft geared to a rear traction-wheel, a clutch normally connecting said shafts, and automatic clutch-retracting means dependent for its action upon the direction in which the front wheels are steered with relation to the longitudinal axis of the vehicle, for the purpose set forth.

3. In a self-propelled vehicle, the combination of a front wheel, a circle supported through the medium thereof, a main frame having its front end supported on said circle, rear traction-wheels supporting the rear portion of the main frame, a motor, a clutch serving normally to communicate motion from the motor to the rear traction-wheels, a clutch-retracting lever, and a cam carried by said circle adapted to actuate said lever to retract said clutch when the circle is turned to a given angle position with relation to the longitudinal axis of the machine.

4. In a self-propelled vehicle, the combination of a front traction-wheel, a circle supported through the medium thereof, a main frame having its front end supported on said circle, rear traction-wheels supporting the rear portion of the main frame, a motor supplied with a crank-shaft, a divided shaft located at one side of and parallel with the crank-shaft, means for communicating motion from said crank-shaft to one section of said divided shaft in either direction, means for communicating motion from said section of said divided shaft to the front traction-wheel, means for communicating motion from the other section of said divided shaft to the rear traction-wheels, and a clutch coupling the sections of said divided shaft together.

5. In a self-propelled vehicle, the combination of a front traction-wheel, a front traction-wheel frame supported thereon, a circle within which the traction-wheel frame is located, pivotal connections between the front and rear portions of the traction-wheel frame and the adjacent portions of said circle, guide-connections between the traction-wheel frame and said circle, permitting oscillation of the traction-wheel frame, a main frame having its front end supported on said circle, rear wheels supporting the rear portion of the main frame, and a motor geared to said wheels.

6. In a self-propelled vehicle, the combination of a pair of front traction-wheels, an axle upon which said wheels are journaled, a wheel-frame supported on said axle, a circle pivotally joined to the front and rear portions of said wheel-frame, bearings carried by said circle in which the end-portions of said axle may move to permit oscillation of said wheel-frame, a main frame having its front end supported on said circle, steering-mechanism connected with said circle, rear wheels supporting the rear portion of the main frame, and a motor mounted on the main frame and geared to said wheels.

7. In a self-propelled vehicle, the combination of a pair of front traction-wheels, a wheel-frame supported thereon, a circle surrounding said wheel-frame and pivotally connected with the front and rear portions thereof, a standard surmounting and rigidly carried by said circle, a vertical shaft coaxial with said circle and journaled in said standard and geared to said wheels, a main frame having its front end supported on said circle, steering-means connected with the circle, rear wheels supporting the rear portion of the main frame, and a motor mounted on the main frame and geared to said rear wheels and to said vertical shaft.

8. In a self-propelled vehicle, the combination of a pair of front traction-wheels, a traction-wheel frame supported thereon, a circle, pivotal connections between said traction-wheel frame and said circle, springs confined between said circle and traction-wheel frame and tending to resist the oscillation of the traction-wheel frame, a main frame having its front end supported on said circle, rear wheels supporting the rear portion of the main frame, a motor, and means for communicating motion from the motor to the front and rear wheels of the machine.

9. In a self-propelled vehicle, the combination of a pair of front wheels, a wheel-frame supported thereon, a circle pivotally connected with the front and rear portions of said wheel-frame, a main frame equipped at its front portion with grooved rollers engaging said circle, steering-mechanism connected with the circle, wheels supporting the rear portion of the main frame, and a motor geared to the front and rear wheels of the machine.

10. In a self-propelled vehicle, the combination of a pair of front traction-wheels, a circle supported through the medium thereof, a main frame having its front end supported on said circle, steering-mechanism connected with said circle, wheels supporting the rear portion of said main frame, a motor geared to the front traction-wheels, means for communicating motion from the motor to the rear traction-wheels, including a clutch, cams carried by the front and rear portions of said circle, and clutch-retracting means adapted to be actuated by said cams.

11. In a self-propelled vehicle, the combination of a pair of front traction-wheels, a circle supported through the medium thereof, a vertical shaft co-axial with said circle and geared to the front wheels, a main frame having its front end supported on said circle, wheels supporting the rear portion of the main frame, a vertical shaft journaled in the main frame adjacent to said circle and geared to said first-named vertical shaft, a transverse shaft geared to said rear wheels, a divided shaft having one section geared to said second-named vertical shaft and the other section geared to said transverse shaft, and a motor geared to said divided shaft.

12. In a self-propelled vehicle, the combination of a pair of front traction-wheels, an axle on which said wheels are journaled, a wheel-frame supported by said axle, a circle surrounding said wheel-frame, bearings between the end portions of said axle and said circle permitting oscillation of the wheel-frame, springs located at said bearings tending to limit the oscillation of the wheel-frame, a main frame having its front end supported on said circle, steering-mechanism connected with said circle, rear wheels supporting the rear portion of the main frame, and a motor geared to the front and rear wheels of the machine.

13. In a self-propelled vehicle, the combination of a pair of front traction-wheels, a wheel-frame supported thereon, a circle pivotally connected with the front and rear portions of said wheel-frame, a longitudinal shaft co-axial with the axis of oscillation of said wheel-frame and geared to said front wheels, a standard surmounting and rigidly carried by said circle, a vertical shaft co-axial with the circle, journaled in said standard and geared to said longitudinal shaft, a main frame having its front end supported on said circle, wheels supporting the rear portion of the main frame, and a motor mounted on the main frame and geared to said vertical shaft and to the rear wheels of the machine.

14. In a self-propelled vehicle, the combination of a pair of front traction-wheels, a pair of rear traction-wheels, a circle supported through the medium of the front traction-wheels, a main frame having its front end supported on said circle and its rear end supported by the rear traction-wheels, a motor geared to the front and rear traction-wheels, and additional ungeared supporting wheels for the machine, said last-named wheels co-axial with one of said pairs of wheels.

15. In a self-propelled vehicle, the combination of a pair of front traction-wheels, a circle supported through the medium thereof, a main frame having its front end supported on said circle, rear traction-wheels supporting the rear portion of the main frame, a motor geared to the front and rear traction-wheels, and additional supporting wheels co-axial with the rear traction-wheels.

16. In a self-propelled vehicle, the combination of a pair of front traction-wheels, a circle supported through the medium thereof, a main frame having its front end supported on said circle, rear traction-wheels supporting the rear portion of the main frame, a motor geared to the front and rear traction-wheels, and additional supporting wheels co-axial with said front traction-wheels.

17. In a self-propelled vehicle, the combination of a frame having side-members provided with wheel-receiving channels at their rear portions and with removable outer sections at said channels, wheels located in said channels, spindles connected with the side-members of the frame and the removable sections thereof, said wheels being journaled upon said spindles, and a motor geared to said wheels.

18. In a self-propelled vehicle, the combination of a main frame having channel-form side-members with the bottoms of the channels cut away at their rear portions, wheels extending through said side-members at the cut-away portions and pivotally connected with said side-members, springs supported in the channel-form side-members, a removable load-platform supported on said springs, and a motor geared to said wheels.

19. In a self-propelled vehicle the combination of a pair of front wheels, a circle supported through the medium thereof, a main frame having its front end supported on said circle and having a raised seat-platform above said circle, wheels supporting the rear portion of the main frame, a load-platform supported above the rear portion of said main frame, a motor disposed beneath said load-platform and supported on said main frame, a vertical shaft co-axial with said circle and having its lower end geared to said front wheels, a vertical shaft journaled on the main frame outside said circle and having its upper end extending to the plane of said seat-platform and geared to the upper end of said first-named vertical shaft, and means for communicating motion from said motor to the lower portion of said second-named vertical shaft.

JESSE W. SUNDERLAND.

In presence of—
R. A. SCHAEFER,
W. T. JONES.